March 25, 1969 R. J. INGHAM ET AL 3,434,330
GAUGE CASING

Filed July 22, 1965 Sheet 1 of 3

INVENTORS
ROBERT J. INGHAM
ROBERT D. BISSELL

Darby & Darby
ATTORNEYS

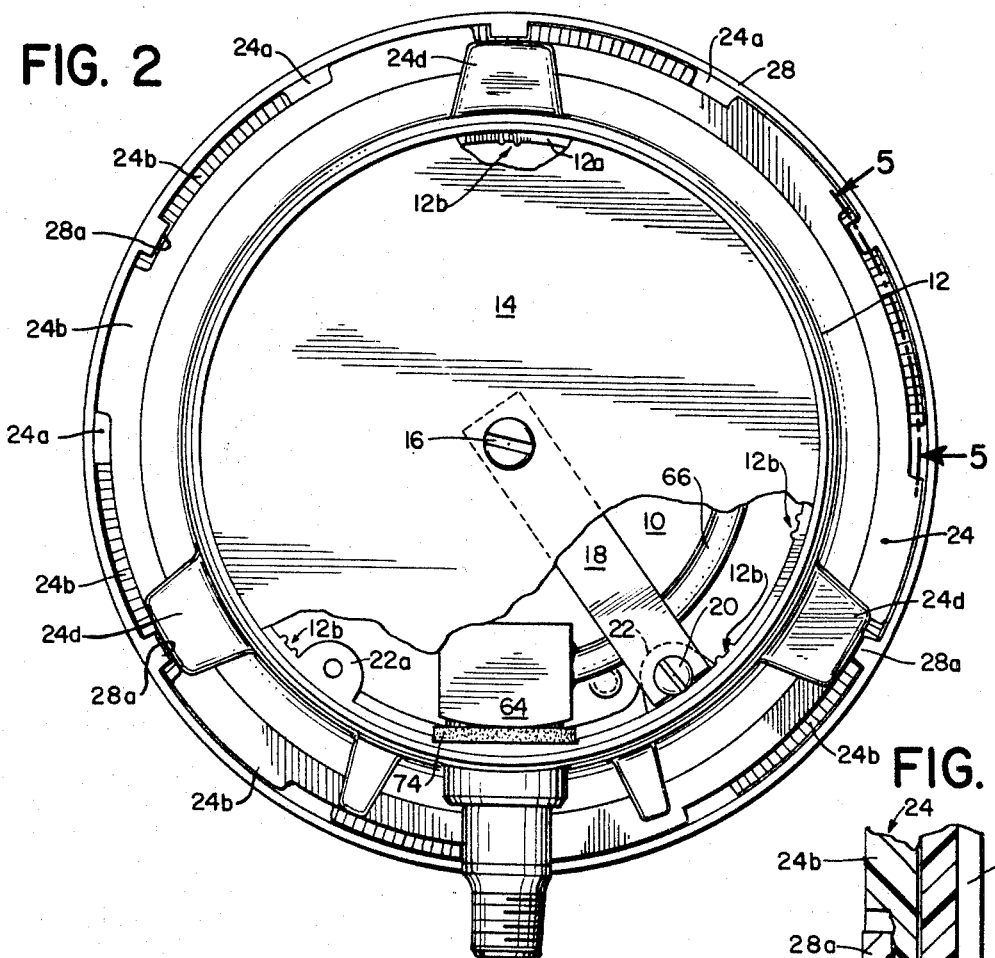
FIG. 2
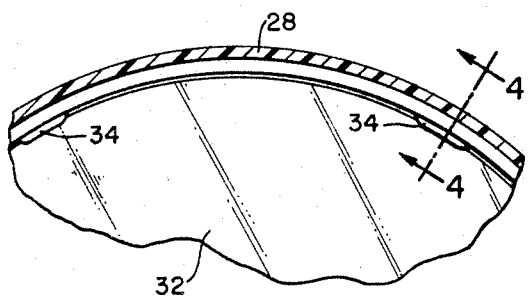
FIG. 3
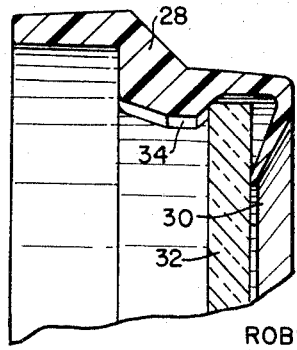
FIG. 4
FIG. 5

INVENTORS
ROBERT J. INGHAM
ROBERT D. BISSELL

BY

*Darley + Darley*

ATTORNEYS

United States Patent Office 3,434,330
Patented Mar. 25, 1969

3,434,330
GAUGE CASING
Robert J. Ingham, Fairfield, and Robert D. Bissell, Orange, Conn., assignors to Dresser Industries, Inc., Stratford, Conn., a corporation of Delaware
Filed July 22, 1965, Ser. No. 474,090
Int. Cl. G01l 27/00, 7/04
U.S. Cl. 73—1                                    12 Claims

ABSTRACT OF THE DISCLOSURE

A fiber glass reinforced plastic casing for a pressure gauge. The casing is provided with a heavy protective front wall for the compartment for the gauge parts and an easily distortable back wall to permit blowout in case of rupture of the gauge parts. A special gauge glass supporting ring cooperates with the casing to minimize entry of moisture and dust. Means are provided so that the gauge may be calibrated by viewing the rear of the casing with the cover removed.

---

This invention comprises a group of improvements in the construction and use of gauges, involving features of safety, construction and assembly, calibration and adjustment.

One object of the invention is to provide a gauge casing adapted to prevent injury to users thereof which might result from rupture of its parts.

Another object of the invention is to provide a gauge having a casing adapted for mounting on the front of a vertical support or in an opening in a vertical support.

Another object of the invention is to provide a gauge casing having an expanded graduated dial of greater diameter than the diameter of the body of the gauge to improve its readability without increasing its space requirements.

A further object of the invention is to provide a novel gauge casing construction wherein the gauge glass is easily mounted and removed while permiting a fluid-tight seal thereat.

Another object is to provide a casing having a gauge glass supporting ring cooperating with the casing in a manner to minimize the possible entry of moisture and dust.

Another object of the invention is to provide a gauge housing molded of materials having optimum corrosion and weather resistance.

Still another object of the invention is to provide a gauge casing having one or more of the above features wherein the casing is made of shockproof plastic materials not easily damaged, as, for example, fiberglass reinforced polypropylene, and wherein the gauge glass or crystal is so supported as to also protect it against impacts applied other than directly thereto.

Still another object of the invention is to provide a gauge housing constructed of materials which avoid galling and seizing of the connected casing parts at the construction employed to detachably connect the parts together.

Still another object of the invention is to provide a crystal retaining ring and a housing having formations including serrated mating surfaces to prevent loosening of the ring.

A further object of the invention is to provide a gauge casing having a heavy protective front wall for the compartment for the gauge parts and an easily distortable back wall to permit blow out in the case of rupture of the gauge parts.

A further object is to provide a pointer design for a gauge of very light weight and of geometrical form such as will permit observation thereof even under high speed pulsation.

Still another object of the invention is to provide a gauge construction which permits not only a calibration of the gauge in the usual manner from the front, but also from the rear of the casing.

As will be apparent from the following description a number of these features are particularly important for incorporation in pressure gauges whereas others may be incorporated in various other types of gauges.

Other and more detailed objects of the invention will be apparent from the following description of the embodiment thereof selected for illustration in the accompanying drawings.

In the drawings:

FIGURE 2 is a rear elevational view of the gauge with a part of the rear cover broken away;

FIGURE 3 is a detailed cross sectional view taken on the line 3—3 of FIGURE 1, illustrating how the gauge glass or crystal is snapped into the mounting ring therefor;

FIGURE 4 is a detailed cross-sectional view taken on the line 4—4 of FIGURE 3, further illustrating this feature;

FIGURE 5 is a detailed cross-sectional view taken on the line 5—5 of FIGURE 2;

Figure 1:
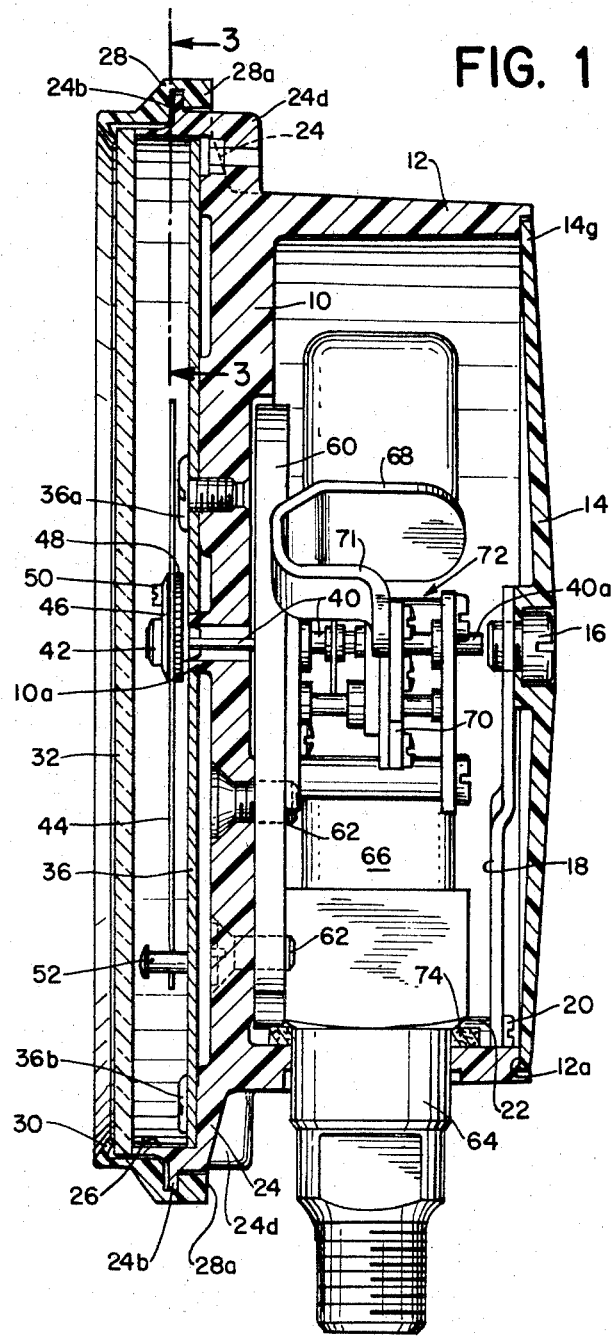
FIGURE 1 is a vertical central cross-sectional view taken at right angles to the gauge face, illustrating the various features of novelty.

As the disclosure proceeds it will be apparent to those skilled in the art that many of the features herein disclosed are applicable to gauges generally, including pressure gauges specifically. A number of these features are particularly useful in gauges operating under the influence of pressure fluids, and, therefore, subject to possible rupture and, thus, injury to users thereof.

In order to obtain the maximum advantages of this invention, although not limited thereto, it is preferred to make the gauge casing, including its back cover and gauge glass mounting ring of a moldable plastic. Suitable plastics are those capable of resisting damage causable by impact or corrosion. Plastic having low cold flow characteristics are preferred. For example, high density plastics such as polypropylene, desirably reinforced with fiberglass in the case of the gauge casing, are especially suitable.

The gauge illustrated in the drawings is used for measuring variations in the pressure of fluids and, therefore, adapted to take full advantage of the features of construction relating to safety in use. The casing comprises a solid, relatively thick, one piece front wall 10 integral with a annular open-sided wall 12 forming a compartment for the operating parts of the gauge. As illustrated in FIGURE 2, this wall has formed on it a pair of threaded ribs 22 and 22a equidistantly spaced on opposite sides of its vertical axis for supporting on one or the other, as illustrated, a cantilever arm 18 secured in this case to the rib 22 by means of the screw 20. The arm 18 extends radially of the compartment to provide for attachment thereto of the closure disk 14, for the open side of the casing, by means of the screw 16. The arm 18 is flexible enough to spring outwardly under pressure on the inner face of the cover 14 to facilitate the release of pressure at the periphery of the cover. The rib 22a provides another point for supporting the arm 18 if conditions make that preferable. It is noted, as is clear from FIGURE 1, that the closure disk 14 is thicker in the center than at the periphery, to impart flexibility to the cover, so that in the event of a sudden increase of pressure within the compartment due to the rupture of one of the gauge parts the rim of the disk can be deformed outwardly to permit the discharge of the escaping fluid. The heavy front wall 10 of the casing insures against damage to the dial 36 and the crystal 32, and, of course, to any observer close to the front of the gauge.

A valuable novel feature of this casing is the provision of an annular flange 24 of greater diameter than that of the wall 12 so as to permit of the use, as will be explained in more detail later, of a dial of increased diameter on which an expanded, more easily readable scale can be displayed. Extending axially of the gauge at the periphery of the expanded flange 24 is an annular wall 26, having its edge face lying in a plane to provide a seat for the crystal 32.

This crystal which can be of glass, plastic or any sufficiently transparent material, is mounted and retained in a mounting ring 28, which is provided with an integral flexible bezel or rim 30, which presses against the outer face of the crystal to form a reasonably good watertight seal. The ring is constructed to have a series of radial protrusions 34, see FIGS. 3 and 4 behind which the crystal can be snapped. The structure is dimensioned so that when the crystal 32 is resting behind the protrusion 34 the flexible bezel 30 is lying against the crystal under pressure, see FIG. 4. By this arrangement the crystal and mounting ring can be handled as a unit being attachable to and removable from the casing without displacement of the crystal from the ring.

The mounting ring 28 is attached over the annular wall 26 by a bayonet connection which includes a series of internal radial projections 28a and the inclined cam surfaces on the extensions 24b formed on the periphery of the flange 24, see FIG. 5 particularly. As shown in FIG. 5, the cooperating faces of the projections 28a and the camming surfaces of 24b can be roughened so as to resist sliding movement therebetween. As is usual with a bayonet connection the ring 28 is slipped over the annular wall 26 so that the projections 28a will pass into the spaces 24a between the extensions 24b on the flange 24. Here again the parts are so proportioned that when the ring 28 is pressed into place ready for rotation into locked position the crystal 32 will engage the annular end edge of the wall 26, see FIG. 1. As the ring is then rotated to effect camming engagement between the projections 28a and the camming surfaces of 24b, the ring 28 will be pulled inwardly forcing the crystal into a fluid tight engagement with that annular surface. At the same time the crystal will be firmly pressed against the bezel 30 forming a fluid tight seal. This construction insures retention of the glass and the ring in position, minimizing its chances of loosening by reason of the cooperation of the serrated faces of the locking projections.

The dial 36 is supported on the face of the annular flange 24 very accurately in the following manner. The wall 10, see FIG. 1, is provided with an accurately positioned central boss 10a which fits snugly in a central aperture in the dial 36. The dial is secured in place by means of the screw 36a, 36b and 36c. As best appears in FIGURE 2, the casing wall 12 to the rear of the wall 10 is provided with pairs of indicia in the form of ribs 12b. The total arcuate span between the terminal pairs of ribs corresponds to the arc of the scale on the dial, in this case 270°. Additional intermediate pairs of ribs 12b are provided to provide particular calibration points. As will appear later, these ribs are provided in pairs with a spacing which is equivalent to the allowable tolerance for calibration error.

Referring to FIG. 1, the actuating mechanism for the gauge is shown generally at 72 and includes a pointer shaft 40 on which is mounted a pointer 44. This pointer is connected to the shaft through a position adjusting mechanism including a curved spring 46 of the Belleville type and an adjusting screw 50. This screw is connected to a smaller pinion 48 which meshes with a pinion 42 on the shaft 40. Thus the relative position of the pointer can be adjusted on the shaft 40 in an obvious manner. The opposite end 40a of the shaft is accessible when the cover 14 is removed and it is possible to calibrate the gauge by placing a temporary pointer on the end 40a of the shaft and applying known pressures to the operating mechanism.

The indicia 12b observable from the rear of the instrument are located to provide for span calibration to linear increments of the span. They provide a reference by means of which the linearity of the linkage system of the operating mechanism can be adjusted. In the calibration of the instrument a temporary pointer is applied to the rear end 40a of the pointer shaft of the operating mechanism. With the operating mechanism de-energized, in this case with no pressure applied to the Bourdon tube, the temporary pointer is applied so as to lie between the ribs 12b at the extreme right of FIG. 2. Pressure fluid under accurate and known pressures corresponding to the other pairs of ribs 12b are then successively applied to the Bourdon spring and the deviation, if any, of the temporary pointer from proper position with respect to the pairs of ribs corresponding to the selected pressures can be adjusted. This adjustment is effected in the well known manner common in adjusting operating mechanisms of this type, wherein, through adjustment of the linkage system, the temporary pointer can be brought to proper position with regard to the rib pairs 12b. When all the adjustments have been made for the selected positions represented by the rib pairs 12b, the proper span and linearity have been adjusted into the linkage system. The temporary pointer is then removed from the pointer shaft. The permanent pointer, in this case the pointer 44 can then be applied to the other end of the pointer shaft 40, that is the end which projects through the dial 36. For example, the permanent pointer can be applied with or without the pressure on the Bourdon spring. If applied without pressure on the spring, it will be positioned at the zero mark on the scale. Its exact positioning with respect to the zero mark can be adjusted, as previously explained, by means of the screw 50. The value and novelty of this method of calibrating the gauge entirely from the rear eliminates the need for the operator to be able to observe the gauge from the front which, as those skilled in the art will understand, is awkward and time consuming.

All of the details of the operating mechanism have not been shown, because they are conventional and capable of a wide range of specific constructions known in the art, see for example U.S. Patent No. 2,541,790. Generally, however, for a pressure gauge such a mechanism includes a Bourdon tube 66 having communication with a threaded socket 64 passing through the wall of the casing and a washer 74 providing a dust seal around the socket shank. Mounted on the other end of the Bourdon tube is a fixture 68 which is connected by means of an adjustable linkage 70 to a toothed segment geared to the pointer shaft 40. This mechanism includes the usual hair spring 71. The operating mechanism forms a unit which is mounted on a supporting plate 60 secured on the inner face of the wall 10 by means of the screws 62.

Figure 6:
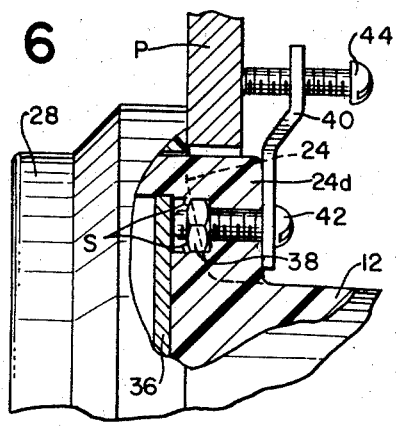
FIGURE 6 is an enlarged, detailed, broken away view illustrating one manner of mounting the gauge of this invention on a vertical support in an aperture.
Figure 7:
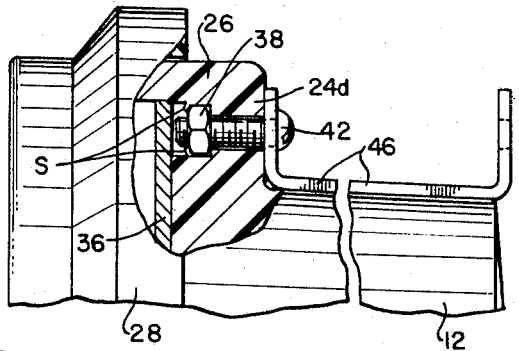
FIGURE 7 illustrates how the basic structure of FIGURE 6, with different accessories, can be mounted on the front of a vertical support.

The annular flange 24 is provided with a series of integral lugs 24d. In the case illustrated there are three of these lugs, see FIG. 2, and, as shown in FIGS. 6 and 7, they are recessed to receive the nuts 38. These nuts are held in the recesses by staking, as indicated at S. With this arrangement, as will be explained, it is possible to provide substantially universal mounting means for the gauge. It can be mounted without additional fixtures directly on a pipeline, for example, through a suitable coupling adapted to receive the threaded end of the socket 64. It can also be mounted in a panel P, see FIG. 6, in a suitably sized opening, by means of the brackets 40 which are secured to the gauge by means of machine screws 42 cooperating with the nuts 38. Instead of the conventional mounting arrangement using one large hole for the body of the gauge and three small holes for three mounting screws, only one large hole is required, thus reducing the amount of time required to prepare panels for flush mounting this casing. Threadedly mounted in the end of each bracket 40 in a machine screw 44 which can be brought into contact with the rear wall of the panel. This is possible because of the fact that the annular flange 24, which provides for the expanded scale, also forms an annular ledge to cooperate with the face of the panel P. With this arrangement it is also possible to mount the gauge on any support by means of U-shaped brackets 46. These brackets are secured to the gauge casing as before, by means of machine screws 42 cooperating with the stake-in nuts 38. The other ends of the brackets 46 can be bolted to the available supports.

Finally, it is noted that the particular shape of the pointer 44 has been selected to insure that it remains visible even under excessive pulsation sometimes encountered in the operation of gauges of this type. The main body of the pointer is of considerably greater width than the reduced end which cooperates with the scale. With this arrangement, under pulsations sufficiently rapid to cause the usual pointer to become unreadable, it is still possible to take readings with this pointer.

Figure 8:
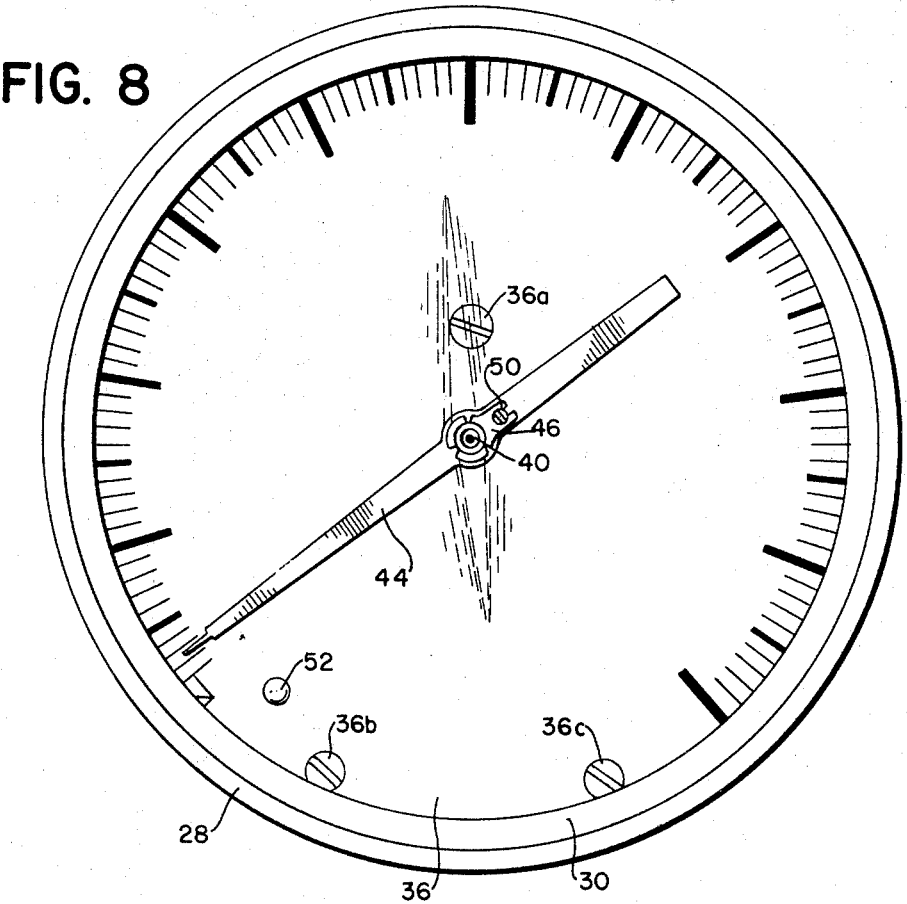
FIGURE 8 is a front elevational view of the gauge.

The readability of the pointer under pulsating pressures, by reason of the design shown in FIG. 8, is explained here. The tip of the pointer is relatively fine and enables accurate interpolation of the pointer position with regard to the scale when the pointer is at rest. However, if the gauge is subjected to pulsating pressure the pointer 44 will, of course, oscillate with the rates depending upon the pulsing rate. As shown in FIG. 8, just back of its tip the pointer abruptly widens. Under rapid pulsation this widened portion appears narrower, thus enabling one to read the center of pointer oscillation quite easily and accurately. This reading, of course, is a measure of the average of the pulsating pressure actuating the gauge. This results from the fact that the pointer can oscillate through an arc to the width of its enlarged section before the pointer begins to appear to be reduced in length. At higher pulsating rates the pointer appears shorter, as applicant has attempted to indicate in dotted lines in FIG. 8.

What is claimed:

1. In a pressure fluid gauge of the type described, a casing having a front wall and an integral annular wall forming a compartment opening rearwardly of said front wall, a pressure fluid actuating mechanism in said compartment, a flexible cover of gradually reduced thickness from its center to its periphery overlying the open end of said compartment and means securing said cover to said casing permitting an overpressure within the casing to be perimetrically relieved at the cover periphery by outward recoverable flexure thereat.

2. In the combination of claim 1, said casing and cover being of molded plastic.

3. In a gauge the sum combination comprising a casing forming an enclosure for an operating mechanism, one wall of said casing having a seat for a dial and an outwardly extending annular wall enclosing said dial seat and forming a crystal seat, a crystal, a ring having a flexible internal bezel overlapping the peripheral edge of said crystal and means on said wall and ring cooperating gradually between relative first and second positions for conjointly forcing said bezel against said crystal and said crystal against its seat.

4. In a condition responsive gauge the combination comprising a housing, a graduated dial mounted on one side of said housing, a condition responsive operating mechanism within said housing having an operating shaft to which is attached a pointer overlying the face of said dial and calibration indicia marks on said housing corresponding to selected condition values to which said pointer is intended to locate on the scale of said dial in response to said condition values existing at said operating mechanism.

5. In the combination of claim 4, said indicia being in pairs spaced a distance to represent calibration tolerances.

6. In the combination of claim 4 in which said indicia marks are at the rear of said housing opposite from the housing side on which said dial is mounted.

7. A method of calibrating a gauge having an actuating mechanism including a pointer shaft, a graduated dial and a pointer mounted on said shaft to overlie the front face of said dial, the steps of temporarily attaching another pointer to the other end of said shaft, energizing said mechanism to move said shaft to selected positions and adjusting said mechanism to correct position deviations of said shaft with respect to standard position indicia at the rear of said dial and removing said temporary pointer.

8. A method of calibrating a gauge having a casing, a graduated dial secured at the front of said casing, an adjustable operating mechanism including a shaft accessible at the front and back of said casing, a pointer mounted on said shaft for movement over the face of said dial and a plurality of indicia at the back of said casing corresponding to its calibration points, comprising the steps of mounting a pointer needle temporarily on the rear end of said shaft in an initial position, energizing said operating mechanism to actuate said shaft to selected indicia positions, adjusting said mechanism to correct deviations of said shaft positions with respect to said indicia and removing said temporary pointer.

9. A method of calibrating a gauge having a casing, a graduated dial secured at the front of said casing, an adjustable operating mechanism including a shaft, a pointer mounted on said shaft for movement over the face of said dial, and a plurality of indicia on said casing corresponding to its calibration points, comprising the steps of mounting a pointer needle temporarily on an end of said shaft, in an initial position, energizing said operating mechanism to actuate said shaft to selected indicia positions, adjusting said mechanism to correct deviations of said shaft positions with respect to said indicia, and removing said temporary pointer.

10. In a pressure fluid gauge of the type described, a casing having a front wall and an integral annular wall forming a compartment opening rearwardly of said front wall, a pressure fluid actuating mechanism in said compartment, a flexible cover of gradually reduced thickness from its center to its periphery overlying the open end of said compartment and means for securing said cover to said casing at the center thereof leaving its periphery free to permit an overpressure within said casing to be relieved at the cover periphery by outward recoverable flexure thereat.

11. In the combination of claim 10, in which said securing means includes a cantilever arm secured to said casing near said annular wall and means for securing said cover at its center to the free end of said arm.

12. In a gauge the combination comprising a casing forming an enclosure for an operating mechanism, one wall of said casing having a seat for a dial and an outwardly extending annular wall enclosing said dial seat and forming a crystal seat, a crystal, a ring including a flexible internal bezel overlapping the peripheral edge of said crystal and bosses cooperating with said bezel for detachably supporting the crystal therebetween and cooperating means on said wall and ring gradually operable between first and second positions for conjointly forcing said bezel against said crystal and said crystal against its seat.

References Cited

UNITED STATES PATENTS

| | | | |
|---|---|---|---|
| 2,402,360 | 6/1946 | Bevins | 73—431 X |
| 2,607,228 | 8/1952 | Coxon | 73—431 X |
| 2,637,618 | 5/1953 | Ray | 116—136.5 X |
| 2,852,742 | 9/1958 | Bakke | 324—15 X |
| 2,880,692 | 4/1959 | Sugden | 73—1 |
| 3,133,825 | 5/1964 | Rubens | 161—93 X |
| 3,141,335 | 7/1964 | Smith | 73—416 |
| 3,162,173 | 12/1964 | Morgan et al. | 73—431 X |
| 3,205,712 | 9/1965 | Hoff | 73—431 |
| 3,201,992 | 8/1965 | Hoff | 73—431 X |
| 1,520,514 | 12/1924 | Snodgrass. | |

FOREIGN PATENTS 21,935  7/1900  Switzerland.

S. CLEMENT SWISHER, *Primary Examiner.*

U.S. Cl. X.R.

73—4, 416, 431